United States Patent
Zhang et al.

(10) Patent No.: US 7,879,493 B2
(45) Date of Patent: Feb. 1, 2011

(54) ALKALI METAL TITANATES AND METHODS FOR THEIR SYNTHESIS

(75) Inventors: Pu Zhang, Ann Arbor, MI (US); Suresh Mani, Ann Arbor, MI (US); Michael R. Wixom, Ann Arbor, MI (US)

(73) Assignee: A123 Systems, Inc., Watertown, MA (US)

( * ) Notice: Subject to any disclaimer, the term of this patent is extended or adjusted under 35 U.S.C. 154(b) by 0 days.

(21) Appl. No.: 11/757,658

(22) Filed: Jun. 4, 2007

(65) Prior Publication Data

US 2007/0281211 A1 Dec. 6, 2007

Related U.S. Application Data

(60) Provisional application No. 60/822,675, filed on Aug. 17, 2006, provisional application No. 60/810,942, filed on Jun. 5, 2006.

(51) Int. Cl.
*H01M 4/58* (2010.01)
*C01G 23/00* (2006.01)

(52) U.S. Cl. .................. 429/231.1; 429/231.5; 423/598

(58) Field of Classification Search .... 429/231.1–231.5
See application file for complete search history.

(56) References Cited

U.S. PATENT DOCUMENTS

| | | | |
|---|---|---|---|
| 5,545,468 A | 8/1996 | Koshiba et al. | |
| 6,221,531 B1 | 4/2001 | Vaughey et al. | |
| 6,372,384 B1 | 4/2002 | Fujimoto et al. | |
| 6,475,673 B1 | 11/2002 | Yamawaki et al. | |
| 6,645,673 B2 | 11/2003 | Yamawaki et al. | |
| 6,706,445 B2 * | 3/2004 | Barker et al. ............. | 429/231.1 |
| 6,759,168 B2 | 7/2004 | Yamasaki et al. | |
| 6,827,921 B1 | 12/2004 | Singhal et al. | |
| 6,881,393 B2 | 4/2005 | Spitler et al. | |
| 6,890,510 B2 | 5/2005 | Spitler et al. | |
| 2002/0102205 A1 * | 8/2002 | Amatucci ................... | 423/598 |
| 2004/0217335 A1 | 11/2004 | Sterzel | |

* cited by examiner

*Primary Examiner*—Patrick Ryan
*Assistant Examiner*—Karie O'Neill Apicella
(74) *Attorney, Agent, or Firm*—Gifford, Krass, Sprinkle, Anderson & Citkowski, P.C.

(57) ABSTRACT

Disclosed is a doped lithium titanate and its use as an electrode in a battery. Further disclosed is a method for making an alkali metal titanate, which method includes mixing an alkali metal compound and a titanium compound, impact milling the mixture, and heating the milled mixture for a time, and at a temperature, sufficient to convert the mixture to the alkali metal titanate. The alkali metal compound can be in the form of $Li_2CO_3$ and the titanium compound can be in the form of $TiO_2$. A dopant may be included in the mixture.

10 Claims, 3 Drawing Sheets

Cycle Life of a LFP/LTO 26650 Cells (3C/-3C)

ALKALI METAL TITANATES AND METHODS FOR THEIR SYNTHESIS

CROSS-REFERENCE TO RELATED APPLICATIONS

This application claims priority of U.S. Provisional Patent Application Ser. No. 60/810,942 filed Jun. 5, 2006, entitled "Alkali Metal Titanates and Methods for Their Synthesis"; and U.S. Provisional Patent Application Ser. No. 60/822,675 filed Aug. 17, 2006, entitled "Doped Lithium Titanate Material and Methods for Its Manufacture", both of which are incorporated herein by reference.

FIELD OF THE INVENTION

This invention relates generally to alkali metal titanates, and more particularly to lithium titanates. More specifically, the invention relates to doped lithium titanates and to a method for manufacturing lithium titanate materials which exhibit superior electrochemical properties when incorporated into lithium batteries.

BACKGROUND OF THE INVENTION

Alkali metal titanates have electrochemical properties which male them desirable as electrode materials for a variety of devices. Lithium titanate ($Li_4Ti_5O_{12}$) has been found to have particular utility as an electrode material for lithium batteries. It is a relatively low-cost material, and exhibits high performance characteristics in lithium batteries; consequently, it is anticipated to have significant utility as an electrode material for high performance, high power batteries such as those utilized in hybrid electric vehicles and other high power applications.

One important characteristic of high power, high performance batteries is rate capacity. That is, the rate at which the batteries can take up and deliver an electrical charge. This parameter is particularly important under high charge/discharge rates as are encountered in electric vehicles and other high power applications.

First cycle reversibility is another very important parameter for rechargeable lithium batteries. This parameter measures the decline in storage capacity when a freshly manufactured lithium battery is initially cycled. Manufacturers compensate for this initial loss by building extra capacity into batteries. However, this approach increases the size and cost of batteries, and industry has always sought to limit magnitude of first cycle reversibility.

Various lithium titanate materials are commercially available and are utilized in the manufacture of lithium batteries. However, heretofore available commercial materials produce lithium batteries having first cycle reversibilities of approximately 80%, which represents a significant inefficiency. Furthermore, there is a need to improve the rate capacities of prior art batteries to make them practical for use in high power applications. Clearly, there is a need for improved lithium titanate electrode materials.

SUMMARY OF THE INVENTION

Disclosed is a doped lithium titanate material. In particular instances, the dopant may comprise a transition metal, and this metal may be one or more of V, Zr, Nb, Mo, Mn, Fe, Cu, and Co. The dopant may be present in amounts up to 20 atomic percent, and in specific instances in the range of 0.1-5 atomic percent. In a particular instance, the dopant comprises Zr.

Further disclosed is a method for preparing alkali metal titanates such as doped and/or undoped lithium titanate. The method involves preparing a mixture of an alkali metal compound such as lithium carbonate together with a titanium compound such as titanium dioxide or some other oxide of titanium, including suboxides. This mixture is impact milled by ball milling, attritor milling or the lice, and the resultant mixture is heated for a time and at a temperature sufficient to bring about a reaction which forms the alkali metal titanate. A dopant material or dopant precursor may be added to the mixture before or after the milling step.

Further disclosed are electrodes which include alkali metal titanates in accord with the foregoing, as well as batteries in which these electrodes comprise the anodes.

DETAILED DESCRIPTION OF THE INVENTION

Figure 1:
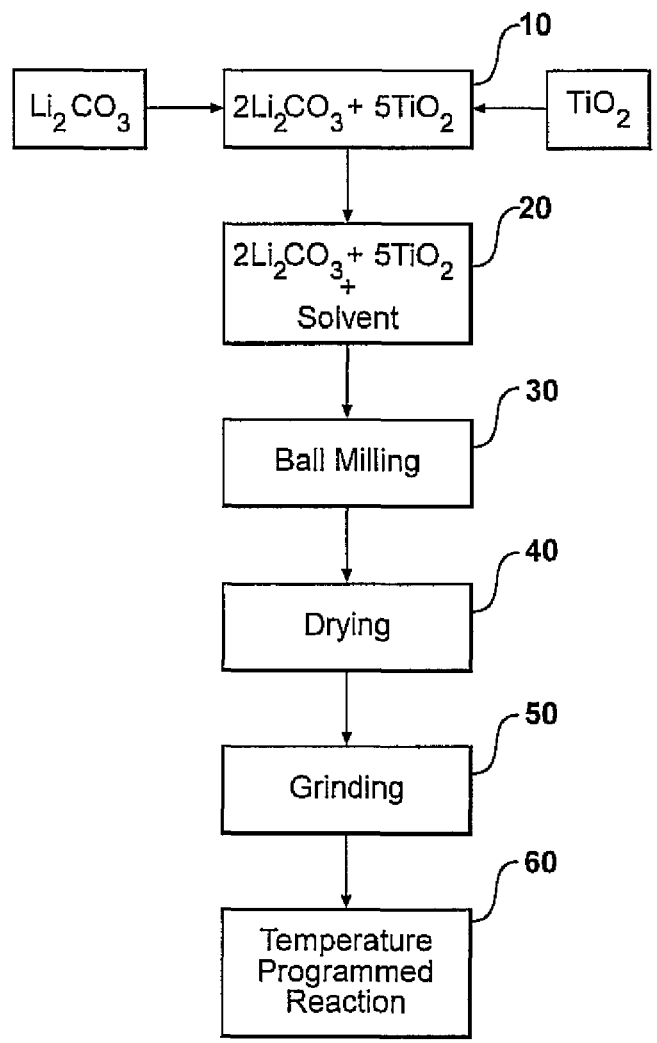
FIG. 1 is a flowchart illustrating a process for synthesizing alkali metal titanates.

In accord with one aspect of the invention there is provided a doped lithium titanate material. Generally, lithium titanate is recognized as having the formula $Li_4Ti_5O_{12}$; however, as is recognized in the art, the stoichiometry of this material may, in some instances, vary without significantly altering the fundamental nature of the material. Such variations may be resultant from a slight oxidation or reduction of the material, minor variations of the LiTi ratio and the presence of dopant species. Accordingly, within the context of this disclosure, all of such stoichiometric and non-stoichiometric materials are encompassed within the definition of lithium titanate.

In a specific group of embodiments, the lithium titanate is doped with a transition metal in an amount up to approximately 20 atomic percent, and some such transition metals include one or more of V, Zr, Nb, Mo, Mn, Fe, Cu, and Co. In one particular instance, as is discussed herein, the dopant comprises Zr, and in particular instances is present in an amount of 0.1-5 atomic percent of the material.

In one group of experiments, undoped lithium titanate of the prior art, and lithium titanate doped with approximately 1% zirconium in accord with the teaching presented herein, were incorporated into anodes of half cells, and the performance of these anodes was evaluated with regard to charge capacity as a function of various charge rates (C), in accord with standard procedures. Data from the experimental series is summarized in Table 1 hereinbelow with regard to both the doped and undoped lithium titanate materials.

TABLE 1

| Sample | | Capacity under different rates (mAh/g) | | | | | | Reversibility (%) |
|---|---|---|---|---|---|---|---|---|
| | | C/10 | 1C | 3C | 6C | 10C | 20C | |
| A: PZ-J28A | Standard LTO | 174 | 170 | 160 | 149 | 129 | 91 | 95 |
| B: PZ-J28B | LTO with 1% Zr dopant | 174 | 170 | 166 | 161 | 157 | 140 | 95 |
| (B − A)/A | Value Change | 0% | 0% | 4% | 8% | 22% | 54% | 0% |

As will be seen from the table, the doped materials provide for cells which manifest a high charge capacity under high charge and discharge rates. These improvements are greatest at very high (10-20 C) rates, and as a result, cells made utilizing the doped lithium titanate material have particular advantages for use in high rate, high power applications such as electric vehicles and backup power systems. Results similar to the foregoing are anticipated utilizing other transition metals as dopant agents. Dopant concentrations generally range up to 20 atomic percent of the material.

There is a fairly large body of prior art directed to the synthesis of lithium titanate materials, and various processes known in the art may be utilized to prepare the doped lithium titanate materials described above. While such prior art processes may be utilized, it has further been found in accord with the present invention that very high quality alkali metal titanates, both doped and undoped, can be prepared by a process which involves impact milling of the starting materials to produce an intimate mixture. This mixture is then reacted at elevated temperatures to produce the alkali metal titanate.

FIG. 1 depicts a flowchart of a process which may be utilized to synthesize both doped and undoped lithium metal titanates. As shown in FIG. 1, lithium titanate is prepared from a mixture of $Li_2CO_3$ and $TiO_2$ with a molar ratio of 2:5 at step 10. These precursor materials are mixed together in a solvent at step 20, such as isopropanal. Other solvents, including organic liquids, aqueous liquids and the lice may be utilized to the extent they do not interfere with the process. The mixture is then subjected to a ball milling process at step 30. A typical milling process is carried out in ceramic jars utilizing zirconia milling media for approximately 48 hours, although milling times can typically range from 10 minutes to 240 hours. In a specific instance, milling takes place for at least 12 hours. While step 30 illustrates a ball milling process, any impact milling process, such as attritor milling, vibratory milling and the like, may be employed. Following the milling, the precursor mixture is dried to remove the solvent at step 40, and ground in air to produce a fine powder at step 50. The mixed precursors are then subjected to a temperature programmed reaction (TPR) under air or oxygen, or an inert gas, in a furnace at step 60.

Figure 2:
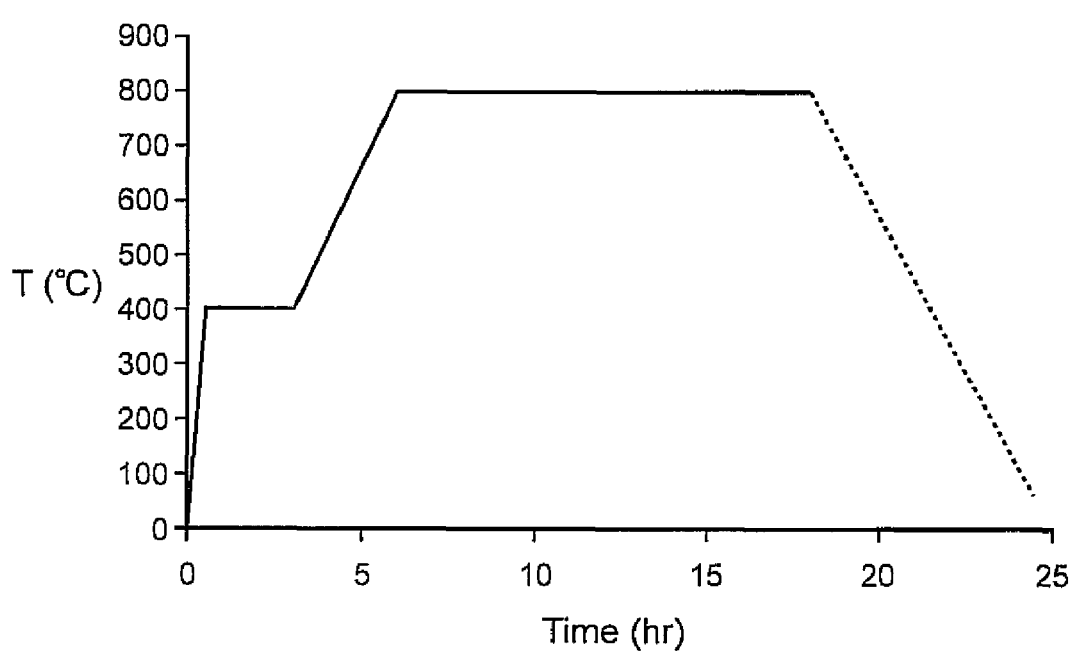
FIG. 2 is a time versus temperature plot illustrating a temperature programmed reaction schedule which may be utilized to fabricate the titanate materials.
Figure 3:
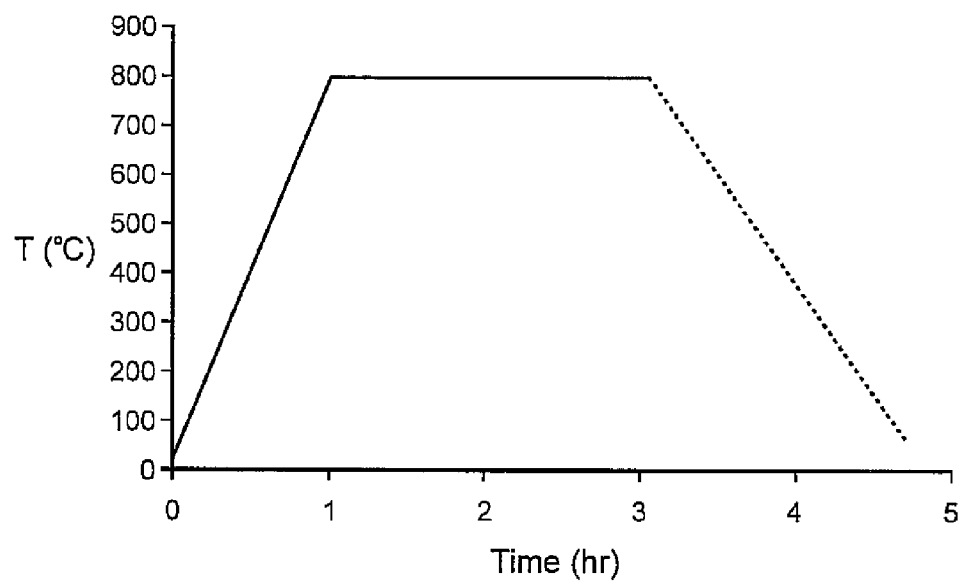
FIG. 3 is another time versus temperature plot illustrating another temperature programmed reaction which may be utilized to fabricate the materials.

The material is typically heated to a temperature of no more than 1000° C. In one typical procedure, the material is taken from room temperature to a temperature of 400° C. over a period of 0.5 hour; held at 400° C. for 2.5 hours; raised to 800° C. over a period of 3 hours; maintained at 800° C. for 12 hours and then cooled to room temperature as illustrated by the time versus temperature graph shown in FIG. 2. In another representative process, the material is taken from room temperature to a temperature of 800° C. over a period of an hour, held at 800° C. for two hours, then cooled to room temperature as shown in FIG. 3.

In those instances where a dopant is incorporated into the lithium titanate material, that dopant may be added to the starting material mixture prior to the impact milling step. In one representative synthetic procedure, doped lithium titanate is prepared from starting materials which include $Li_2CO_3$ and $TiO_2$, together with a dopant precursor compound, which for purposes of illustration will be a zirconium dopant. The precursor may comprise a carbonate, acetate, chloride, alkoxide, or other compound of the dopant metal. In the instance of zirconium, the molar ratio of Li:(Ti+Zr) is 4:5 with the concentration of Zr being 0.1-5 mole percent of Ti+Zr. The precursors are mixed in an appropriate solvent, milled, and further processed as described above to produce the doped material.

It has been found that titanate materials, both doped and undoped, produced by the foregoing method in which precursor materials are milled together, provide titanate products having superior properties which are manifest in cells in which they are incorporated. As such, the methods and materials of the present invention are distinguished from those of the prior art, which prior art is acknowledged to include the use of impact milling steps implemented on the titanate material after it has been synthesized.

Table 2 below summarizes some physical parameters measured for prior art lithium titanate materials, referred to in the table as prior art LTO, and materials made in accord with the foregoing, referred to in the table as T/J LTO.

TABLE 2

| Parameter | Prior Art LTO | T/J LTO |
|---|---|---|
| Particle size (μm) | <1 | ~5 |
| Surface area (m²/g) | 60 | 4 |
| Ionic conductivity (S/cm) | $1.14 \times 10^{-5}$ | $1.35 \times 10^{-4}$ |
| Reversibility | 80% | 95% |

As will be seen from the table, material made in accord with the present procedure has a particle size greater than that of the prior art material. Likewise, the surface area of the materials of present invention is correspondingly smaller, which implies that the materials of present invention can be more stable or safer than the prior art material, in an electrochemical environment. Ionic conductivity of the material of present invention is higher than that of the prior art material by approximately an order of magnitude. Most significantly, the first cycle reversibility of cells which incorporate the material of the present invention is approximately 95%, while that of the prior art is only 80%.

Figure 4:
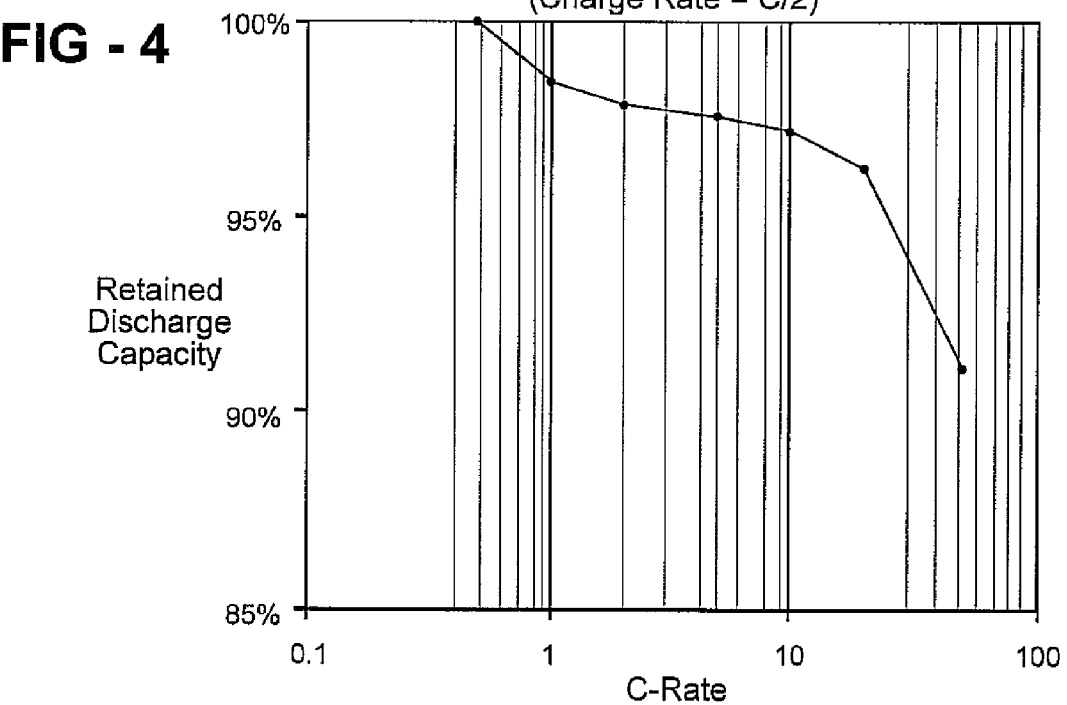
FIG. 4 is a graph showing the capacity retention of a cell which incorporates a lithium titanate anode.

Cells which include lithium titanate anodes prepared in accord with the foregoing, and conventional lithium iron phosphate cathodes were prepared and evaluated. FIG. 4 shows the rate capability of cells prepared utilizing the present lithium titanate materials. As will be seen, the cell of FIG. 4 shows an excellent rate capability with 98% capacity retention at a 20 C discharge rate, and 91% capacity retention at a 50 C rate. Cells of this type have excellent utility in high power, high performance applications.

Figure 5:
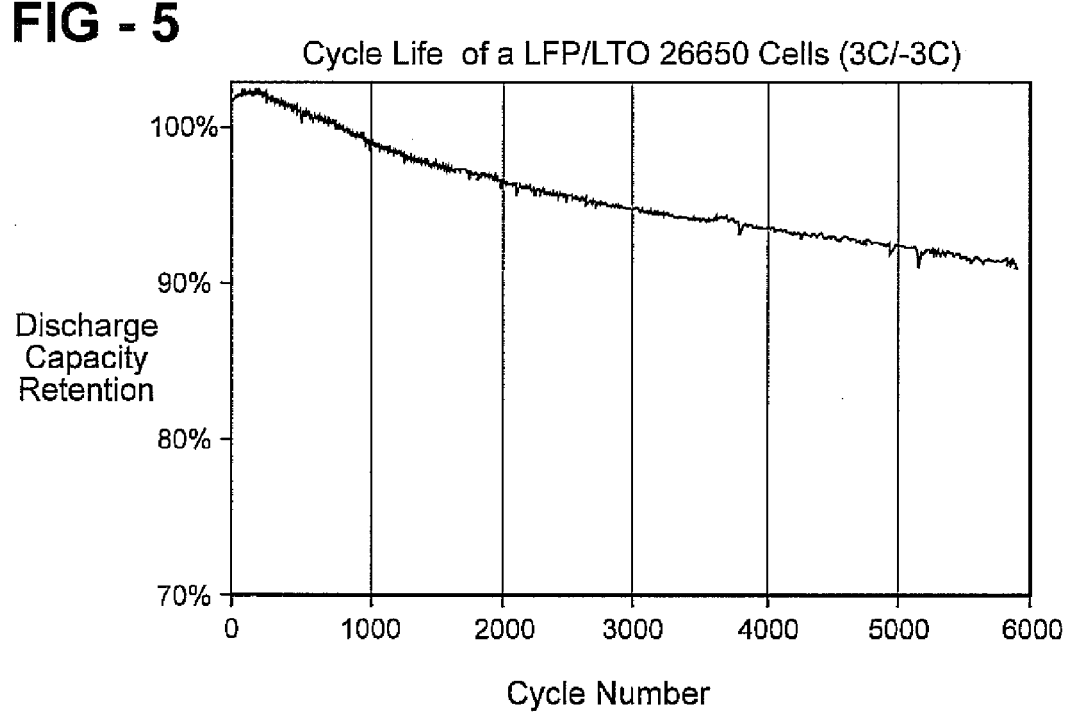
FIG. 5 is a graph showing the cycle life of the cell of FIG. 4.

FIG. 5 shows the cycle life of a cell of the type illustrated with reference to FIG. 4 and depicts discharge capacity retention as a function of charge/discharge cycles carried out at 3 C/−3 C. As will be seen, this cell retains over 90% of its capacity after 6000 cycles.

Figure 6:
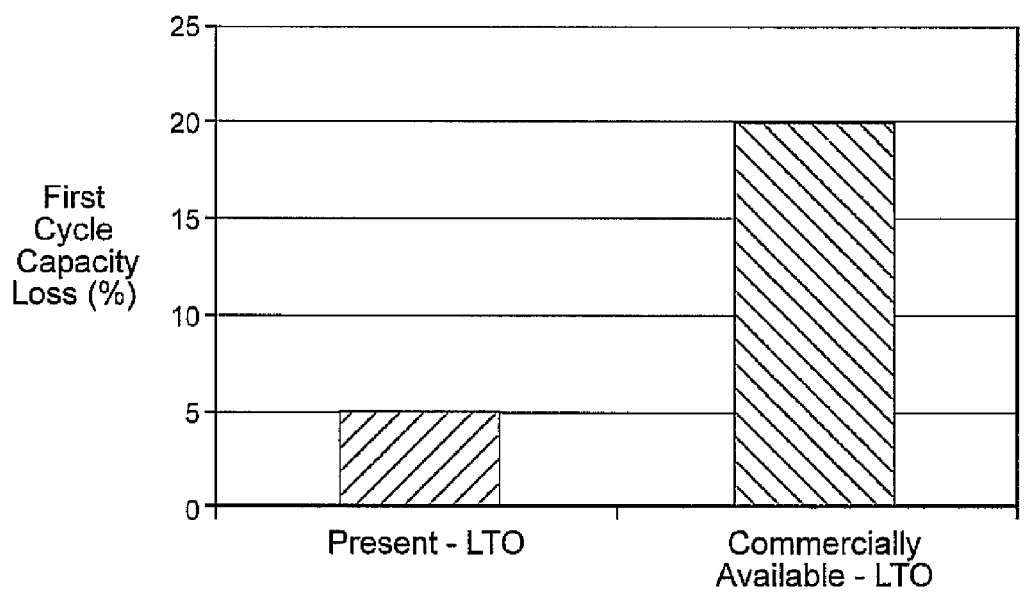
FIG. 6 is a graph illustrating the first cycle capacity loss of a prior art cell and a cell which incorporates the present lithium titanate material.

Further tests were carried out to measure the first cycle capacity loss of the foregoing batteries, and the results thereof are shown in FIG. 6. As will be seen, these batteries demonstrated a first cycle capacity loss of approximately 5%, as compared to typical losses of approximately 20% in similar cells prepared utilizing commercially available lithium titanate anode materials. In addition to the foregoing, the anode materials of the present invention delivered approximately 160-175 mAh/g through repeated cyclings and retained capacities of at least 120 mAh/g at 20 C rate cyclings. The performance of the materials of the present invention greatly exceeds that of prior art anode materials, both titanate and graphite based.

As will be seen, the present invention provides high quality lithium titanate materials and methods for their synthesis. The materials of the present invention have properties which allow for the fabrication of lithium batteries which are stable, efficient, and capable of reliably delivering very high levels of power. These properties, together with the low costs achieved through the use of the disclosed methods, make this technology particularly advantageous for the manufacture of high power battery systems such as those used in electric vehicles, large power tools, power backup systems, and the like.

While the invention has been described with reference to particular lithium titanate materials, it is to be understood that it may be utilized for the preparation of other alkali metal titanates. Also, while specific lithium titanate materials doped with transition metals have been described, it is to be understood that the present invention is broadly applicable to doped and undoped materials, and in those instances where doped materials are utilized, dopants other than transition metals may be utilized.

In view of the teaching presented herein, further modifications and variations will be apparent to those of skill in the art. Accordingly, the foregoing is understood to be an illustration, but not a limitation, upon the practice of the invention. It is the claims, including all equivalents, which define the scope of the invention.

The invention claimed is:

1. A method of making a zirconium doped, alkali metal titanate, said method comprising the steps of:
   providing an alkali metal compound which comprises lithium carbonate;
   providing a first preselected amount of a titanium compound;
   providing a second preselected amount of a zirconium compound wherein the atomic percent of zirconium in said second preselected amount is in the range of 0.1-5% of the combined atomic percent of titanium in said first preselected amount and zirconium in said second preselected amount;
   preparing a mixture of said alkali metal compound, said first preselected amount of said titanium and said second preselected amount of said zirconium compound by impact milling said alkali metal compound, said titanium compound and said zirconium compound; and
   heating said mixture for a time, and at a temperature, sufficient to convert said mixture to said zirconium doped alkali metal titanate.

2. The method of claim 1, wherein said titanium compound comprises an oxide of titanium, and said alkali metal titanate comprises lithium titanate which is doped with 0.1-5 atomic percent of zirconium.

3. The method of claim 1 wherein said step of preparing a mixture comprises mixing approximately 2 moles of $Li_2CO_3$ and approximately 5 moles of $TiO_2$.

4. The method of claim 1, wherein said impact milling process comprises ball milling or attritor milling.

5. The method of claim 1, wherein said step of heating said mixture comprises heating said mixture to a temperature of no more than 1000° C.

6. The method of claim 5, wherein said step of heating said mixture comprises maintaining said mixture at a temperature of 800° C.

7. The method of claim 1, wherein said reaction mixture is maintained at said temperature for at least one minute.

8. The method of claim 1, wherein said reaction mixture is maintained at said temperature for at least two hours.

9. The method of claim 1, wherein said step of heating is carried out under an atmosphere which is an inert atmosphere or an oxidizing atmosphere.

10. The method of claim 1, wherein the atomic percentage of zirconium in said second predetermined amount is 1% of the combined atomic percent of titanium in said first preselected amount and zirconium in said second preselected amount.

* * * * *